United States Patent
Skurka et al.

(10) Patent No.: US 6,575,863 B2
(45) Date of Patent: Jun. 10, 2003

(54) INWARDLY CAMBERED ROCKER JOINT FOR A POWER TRANSMISSION CHAIN

(75) Inventors: John Charles Skurka, Brooktondale, NY (US); Steven Harold Manning, Berkshire, NY (US)

(73) Assignee: BorgWarner, Inc., Troy, MI (US)

( * ) Notice: Subject to any disclaimer, the term of this patent is extended or adjusted under 35 U.S.C. 154(b) by 0 days.

(21) Appl. No.: 09/825,527

(22) Filed: Apr. 3, 2001

(65) Prior Publication Data

US 2002/0173393 A1 Nov. 21, 2002

(51) Int. Cl.[7] ............................................... F16G 13/04
(52) U.S. Cl. ....................................................... 474/215
(58) Field of Search ................................. 474/212–215, 474/210, 206, 216, 217; 59/4, 78, 78.1

(56) References Cited

U.S. PATENT DOCUMENTS

| | | | |
|---|---|---|---|
| 1,743,500 A | * 1/1930 | Sturtevant | .................... 474/214 |
| 2,067,243 A | 1/1937 | Perry | |
| 2,324,640 A | 7/1943 | Perry | |
| 2,653,485 A | * 9/1953 | MacArthur | .................. 474/215 |
| 3,213,699 A | * 10/1965 | Terepin | ...................... 474/215 |
| 4,758,210 A | 7/1988 | Ledvina | ...................... 474/212 |
| 4,764,158 A | 8/1988 | Honda et al. | ............... 474/212 |
| 4,911,682 A | 3/1990 | Ivey et al. | .................. 474/245 |
| 5,192,253 A | 3/1993 | Cole, Jr. et al. | ............ 474/214 |
| 5,236,399 A | * 8/1993 | Sugimoto et al. | ........... 474/215 |
| 5,419,743 A | 5/1995 | Takeda et al. | .............. 474/157 |
| 5,453,059 A | 9/1995 | Avramidis et al. | .......... 474/212 |
| 5,588,926 A | 12/1996 | Mott et al. | .................. 474/212 |
| 6,260,345 B1 | * 7/2001 | Kanehira et al. | ........... 474/215 |

FOREIGN PATENT DOCUMENTS

JP          6-299443    * 8/1994    ................. 474/215

\* cited by examiner

*Primary Examiner*—Marcus Charles
(74) *Attorney, Agent, or Firm*—McAndrew, Held & Malloy, Ltd.; Greg Dziegielweski

(57) ABSTRACT

An inwardly cambered rocker joint for a power transmission chain is disclosed. The rocker joint includes a straight pin that defines a rocking surface and engages a first chain link. The rocker joint also includes an inwardly cambered rocker that engages a second chain link and that defines a rocking surface that contacts the pin rocking surface near the ends of the rocker. The inwardly cambered rocker joint provides a stiff joint that reduces tight strand resonance and chain wash.

10 Claims, 3 Drawing Sheets

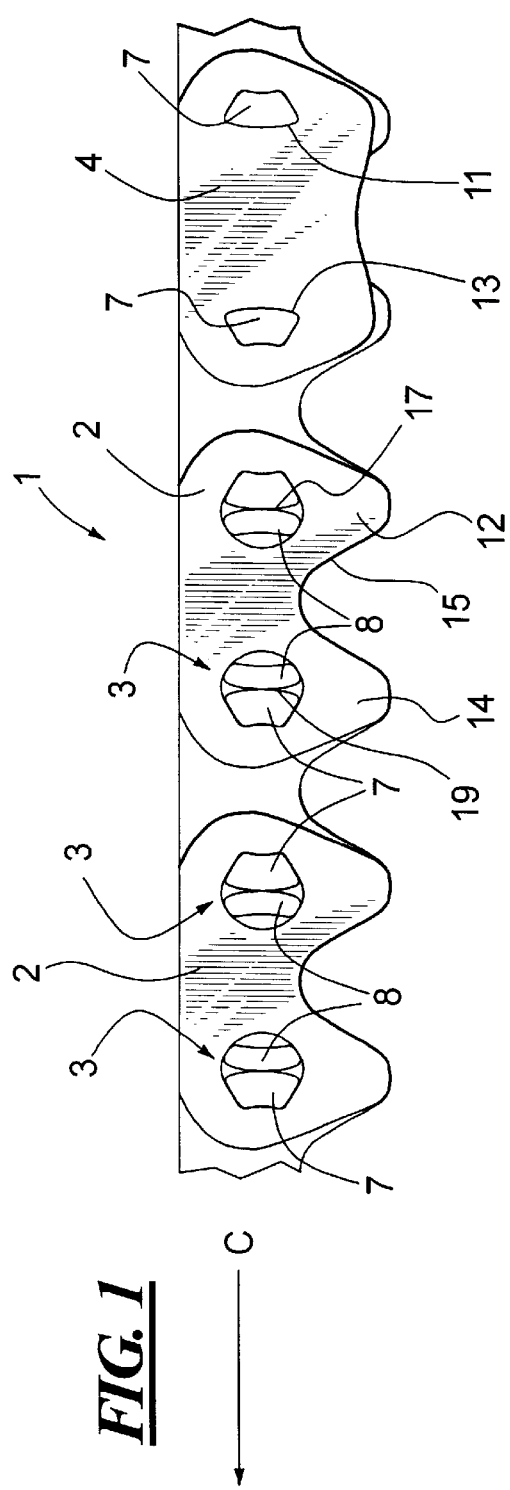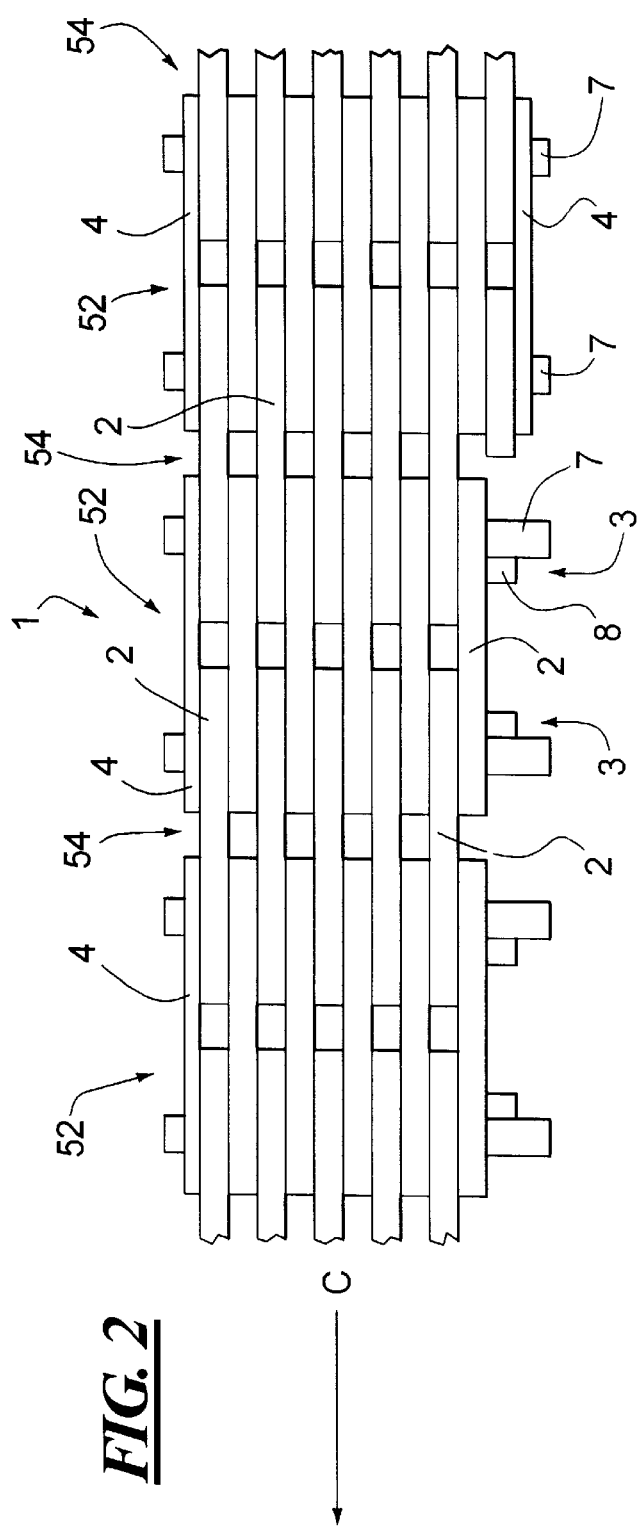

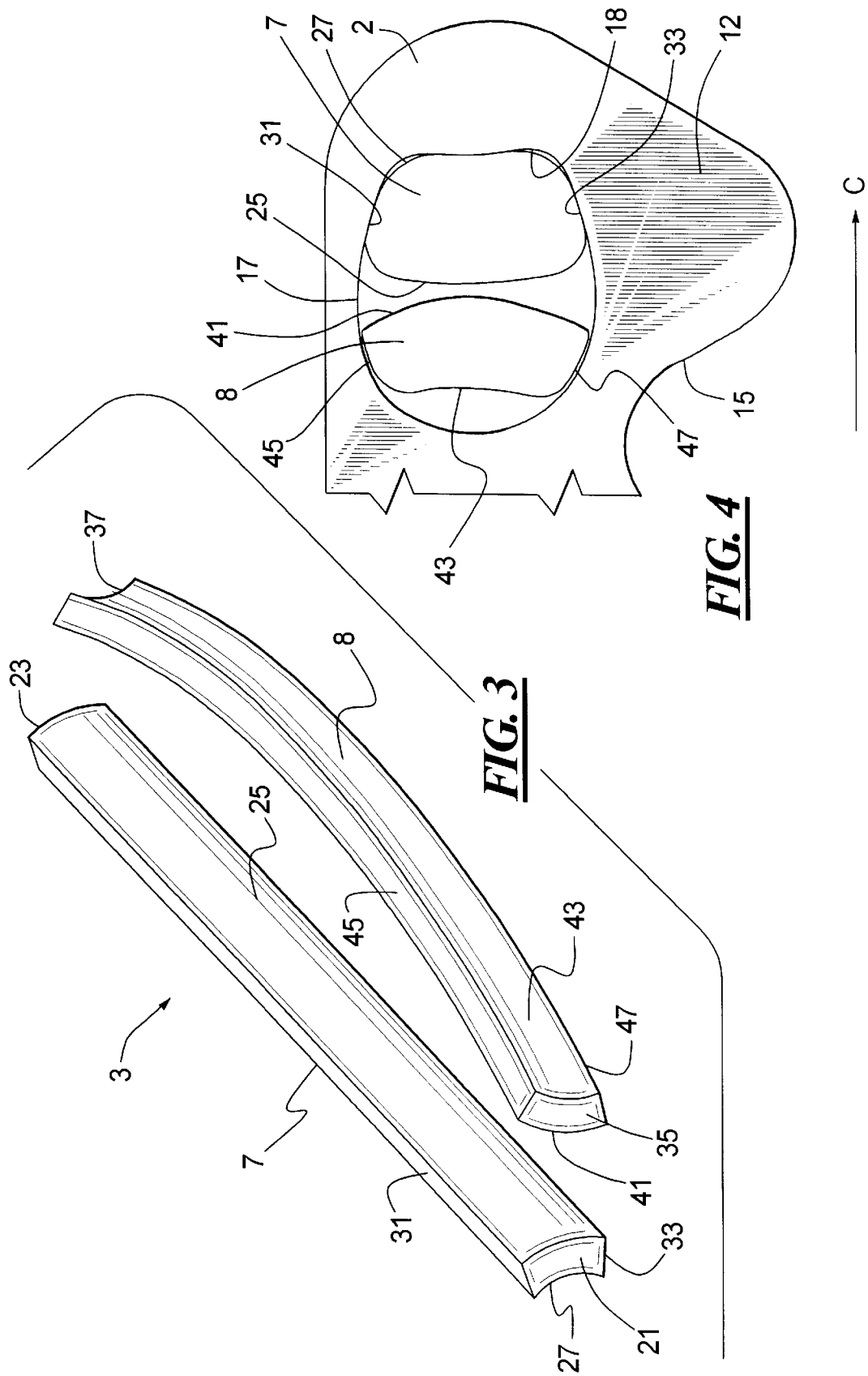

INWARDLY CAMBERED ROCKER JOINT FOR A POWER TRANSMISSION CHAIN

CROSS-REFERENCE TO RELATED APPLICATIONS

None

1. Field of the Invention

The present invention relates generally to power transmission chains and particularly to an improved rocker joint for such chains. The invention has particular application to power transmission chains of the inverted tooth or silent chain variety.

2. Background of the Invention

Power transmission chains are widely used in the automotive industry and other industrial applications. One type of power transmission chain is referred to as a silent chain. Silent chains utilize links with inverted teeth that are formed to engage the teeth of sprockets. Silent chains are often used in engine timing applications, as well as in the transfer of power from a torque converter to a transmission. They are also used in the transfer case of a four-wheel drive vehicle, and in vehicle transmissions.

Silent chains conventionally comprise an assembly of generally flat links that each form two teeth and define a crotch between the teeth. A silent chain is formed from links that are positioned side by side so that a chain tooth is formed by the teeth of adjacent flat links. The links may be interleaved through the width of a chain so that the links forming a chain tooth alternately extend from the chain tooth in opposite directions along the chain to form adjacent chain teeth. Alternatively, a silent chain may be formed by sets or ranks of links that are positioned alongside of each other so that both teeth of a flat link are aligned with the teeth of an adjacent link. Aligned ranks of inverted teeth links are connected to each other so that adjacent links can rotate with respect to each other at the connection. Examples of known silent chains are found in U.S. Pat. Nos. 4,758,210, 5,419,743 and 5,453,059.

Silent chains may include guide links. The guide links are positioned at opposite sides of the chain across its width. The guide links in these locations extend adjacent to the tooth of a sprocket that engages the chain by extending into the chain between chain teeth. The guide link thereby positions the chain on the sprocket. Other silent chains are self-guided. Self-guided chains use inverted tooth outer links having a crotch of a different height than the crotch of the inner links instead of using guide links. The outer links, with a different height crotch between teeth, engages a sprocket having teeth formed to extend into a chain crotch between the outer links to position the chain laterally on the sprocket. An example of a self-guided silent chain is found in U.S. Pat. No. 5,588,926.

For both types of silent chain assemblies, adjacent links may be connected by pivot members that extend through the silent chain through openings in the adjacent flat links at two adjacent chain links that are aligned to collectively form an opening extending across the width of the silent chain. In the past, both pins and rocker joints have been used as the pivot members. Round pins can have a high wear rate due to the sliding action between the pin and the inside of a link opening. To avoid this wear problem, rocker joints have been used.

Conventional rocker joints are formed by two members, a pin and a rocker that extend through the width of a silent chain. The pin engages a chain link extending in one direction along the chain from the rocker joint, and the rocker engages a chain link extending in the opposite direction. The pin and the rocker each form a rocking surface. The pin rocking surface faces generally along the chain direction that the link engaging the pin extends, and the rocker rocking surface faces generally along the chain direction that the link engaging the rocker extends. The rocking surfaces of the pin and link contact each other and rock against each other as the links that engage the pin and rocker rotate with respect to each other. By allowing movement by a rocking contact between the pin and rocker as the chain links rotate, rocker joints reduce the wear of the joint as compared to a pin joint or other sliding joint.

When used with a silent chain, typically one member of the rocker joint is longer. The longer member extends across the width of the chain to engage the laterally outermost links that may be guide links. The longer member engages and moves with the chain link that includes the outermost links. The shorter member of the rocker joint resides between the outer links and engages the link that does not include the outermost links.

The pin and rocker of a conventional rocker joint are straight. Conventional rocker joints do not provide a stiff joint between links. The low stiffness of conventional rocker joints produces noise due to tight strand resonance. Additionally, free play in conventional rocker joints causes wash, or link-to link noise.

Noise created by silent chains is a longstanding problem. Reduction of noise created during operation of silent chains has been the focus of many efforts, including changes in the shape of the chain teeth, varying the chain pitch, and phasing the chain and sprocket relationship. Two such prior attempts to decrease noise are disclosed in U.S. Pat. Nos. 5,419,743 and 5,453,059. Prior efforts have not addressed the noise created by tight strand resonance of a silent chain, and "wash", or link-to link noise caused by free play in a chain.

The prior art discloses rocker joints and other two member chain joints in which one or both members are not straight. U.S. Pat. No. 2,067,243 discloses the use of a toothed drive chain with a pin and spring member in each aperture of the links. The pins are straight and define a flat surface against which a spring member is positioned. The spring member is bent, or cambered, so that the spring contacts the pin near its middle and is separated from the pin near the pin ends. This configuration is referred to as outwardly cambered. The pin and spring do not rotate with respect to each other. The spring is not a working part of the joint, but rather urges links apart to take up free play in the joint and to provide stiffness at the joint. Thus, the joint of this patent is a single pin joint.

U.S. Pat. No. 4,764,158 discloses a power transmission chain with rocker joints formed by two bent rockers. Each rocker forms a rocking surface that contacts the rocking surface of the other rocker. The rockers are outwardly cambered so that they contact near their middle and separate from the adjacent rocker near the ends. The rockers are inserted in openings that are sized so that the rockers are spaced from each other thereby increasing the range of motion of the joint. This design is incompatible with a chain having guide links or other link that maintains the chain's lateral position.

U.S. Pat. No. 4,911,682 discloses a CVT chain belt with two pins forming a rocker joint. The pins form rocker surfaces. One or both pins are inwardly cambered so that the rocker surfaces of the pins contact each other at the ends of the pins. The pins rotate with the links of the CVT chain belt and are cambered to be retained within the chain during handling and assembly. The pins can move laterally within the chain belt. The pins flatten against each other during operation.

U.S. Pat. No. 2,324,640 discloses a chain having joints that include a bowed leaf spring sandwiched between 2 pinnate sections that have semi-cylindrical exterior bearing surfaces. Chain teeth rotate on the exterior bearing surfaces of the pinnate sections. The spring urges the pinnate sections against the links to shorten the chain pitch. The links rotate about the pinnate sections and thus there is no rocking contact at the joint to avoid wear problems.

There remains a need for a rocker joint for a power transmission chain that will reduce tight strand resonance and the noise associated with it, that will provide the reduced wear of a rocker joint, and that will allow use of guide links or self-guided chain technology to maintain the chain's lateral position.

SUMMARY OF THE INVENTION

A rocker joint according to the present invention joins a first chain link of a power transmission chain to an adjacent second chain link of the chain. The first and second chain links are configured to interleave with each other so a joint portion of the first chain link is positioned adjacent to a joint portion of the second chain link. The first and second chain links define openings in the joint portions that are located so that the openings are aligned when the first and second chain links are interleaved with each other. The openings in the chain links bound a joint opening that extends through the first and second chain links.

A rocker joint according to the present invention includes a pin and a rocker that are positioned within the joint opening. The pin extends through the joint opening and engages the opening in the first chain link so that the pin rotates with the first chain link. The rocker extends through the joint opening and engages the opening in the second chain link so that the rocker rotates with the second chain link. The pin is generally straight and defines a rocking surface within the joint opening. The rocker defines a rocking surface that is adjacent to the pin rocking surface. The rocker extends from a first end to a second end and is inwardly cambered so that the rocker rocking surface contacts the pin rocking surface near the first and second ends of the rocker and is separated from the pin rocking surface between the first and second ends of the rocker. The pin and the rocker may define seating surfaces that engage mating surfaces of the openings in the chain links.

The straight pin and inwardly cambered rocker provide increased stiffness of the joint with a resulting reduction of tight strand resonance, as well as an overall lessening of noise by eliminating free play in the chain. Furthermore, the camber allows the chain to be assembled by providing the smallest width of the rocker joint at its ends, providing a small profile leading end for insertion into the joint opening.

For a more complete understanding of the invention, one should refer to the detailed description of the embodiment and the accompanying drawings, which are not to scale.

BRIEF DESCRIPTION OF THE DRAWINGS

FIG. 1 is a side elevation view of a portion of a silent chain formed of interleaved link plates and having rocker joints according to the present invention.

FIG. 2 is a top view of the silent chain shown by FIG. 1.

FIG. 3 is perspective view of a pin and rocker of a rocker joint according to the present invention.

FIG. 4 is a side view of a section of a silent chain link plate and rocker joint according to the present invention near the middle of the rocker joint.

DETAILED DESCRIPTION OF PREFERRED EMBODIMENTS

Figure 6:
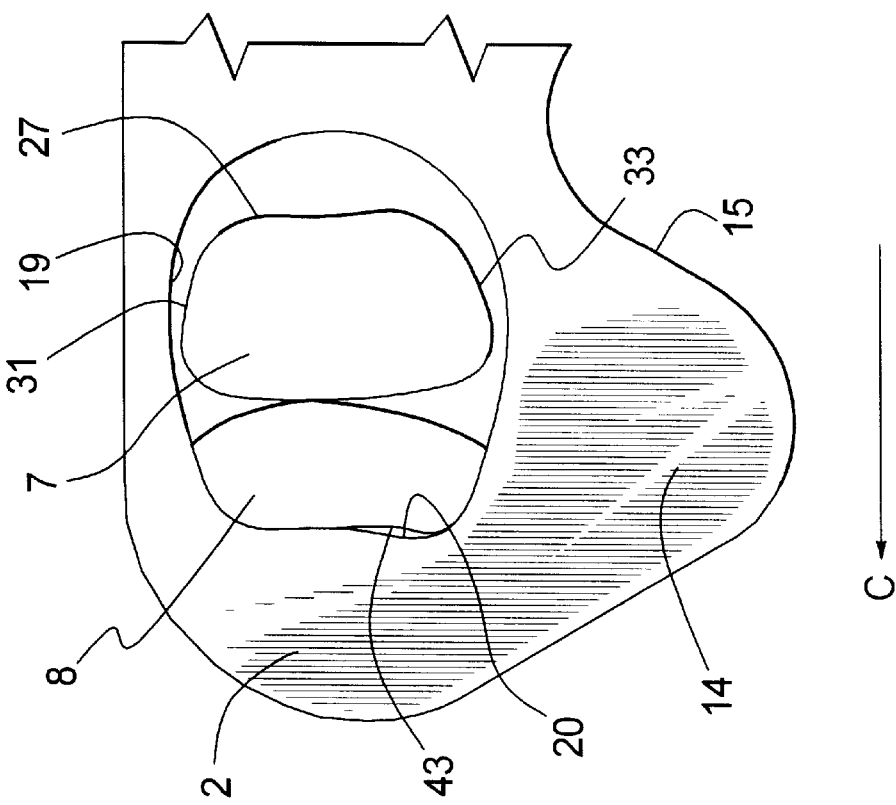
FIG. 6 is a side view of a section of a silent chain link plate interleaved with the link plates shown by FIG. 4 and FIG. 5 and rocker joint according to the present invention joining those links.

FIG. 1 and FIG. 2 illustrate a portion of an endless silent chain 1 having a rocker joint 3 according to the present invention. The silent chain 1 engages one or more sprockets (not shown). The silent chain 1 includes rows of interleaved link plates 2 joined to each other by rocker joints 3. As best shown by FIG. 2, the silent chain 1 also includes guide plates 4 that form the outermost links of the silent chain 1. FIG. 1 and FIG. 2 are partial section views of the silent chain 1 that omit some guide plates 4 and also omit the interleaved link plates 2 immediately adjacent to the omitted guide plates 4.

As shown by FIG. 1, each link plate 2 forms two teeth, 12 and 14, that are separated by a crotch 15 between tooth 12 and tooth 14. The teeth 12 and 14 are side by side along the chain direction C. The teeth 12 and 14 are configured to extend between adjacent teeth of a sprocket (not shown) and the crotch 15 is configured to accept a tooth of the sprocket between the teeth 12 and 14. An opening 17 is formed within the link plate 2 adjacent to the tooth 12 and an opening 19 is formed within the link plate 2 adjacent to the tooth 14. Rocker joints 3 extend through the openings 17 and 19 to join the adjacent link plates 2.

As best shown by FIG. 2, the link plates 2 are positioned adjacent to other link plates 2 within the silent chain 1 so that openings in the link plates 2 are aligned allowing a rocker joint 3 to extend through the openings and across the chain 1 generally perpendicular to the chain direction C. The direction through the link plates 2 of the rocker joints 3 is the width of the chain 1. The link plates 2 are interleaved along a rocker joint 3. That is, link plates 2 that are adjacent to each other along a rocker joint 3 extend oppositely along the chain direction C. As a consequence, a tooth 14 of one link plate 2 is adjacent to a tooth 12 of an adjacent link plate 2. Also, the rocker joint 3 extends through the opening 17 of a link plate 2, and through the opening 19 of the adjacent link plate 2 along the rocker joint 3.

As shown best by FIG. 1 and FIG. 3, the rocker joint 3 includes a pin 7 and a rocker 8. The pin 7 is generally straight and elongate along a direction from a first pin end 21 to a second pin end 23. The elongated direction of a pin 7 in a chain 1 is along the width of the chain 1. The pin 7 defines four sides along its elongate direction, a rocking surface 25, a seating surface 27 that is separated from the rocking surface 25, and side surfaces 31 and 33 extending between the rocking surface 25 and the seating surface 27. As best shown by FIG. 3, the rocking surface 25 is a convex curved surface, while the seating surface 27 is a concave surface. The side surfaces 31 and 33 are slightly convex curved surfaces. The rocker 8 is generally elongate extending from a first rocker end 35 to a second rocker end 37. The elongated direction of a rocker 8 in a chain 1 is along the width of the chain 1. The rocker 8 defines four sides along its elongate direction, a rocking surface 41, a seating surface 43 that is separated from the rocking surface 41, and side surfaces 45 and 47 extending between the rocking surface 41 and the seating surface 43. As best shown by FIG. 3, the rocking surface 41 is a convex curved surface, while the seating surface 43 is a concave surface. The side surfaces 45 and 47 are slightly convex curved surfaces.

The pin 7 and the rocker 8 have cross sections in a plane perpendicular to their elongate direction that is generally uniform along their elongate directions. The pin 7 is generally straight along its elongate direction. The rocker 8 forms an arc along its elongate direction positioning the rocker 8 between the rocker ends 35 and 37 away from a straight line joining the rocker ends 35 and 37 in a direction from the rocking surface 41 toward the seating surface 43. The distance from the straight line joining the rocker ends 35 and 37 increases with distance from the rocker ends 35 and 37 to a greatest deflection approximately midway between the ends 35 and 37. The configuration of the surfaces 25, 27, 31, 33, 41, 43, 45, and 47 are additionally described below by reference to the function of the pin 7 and the rocker 8 in the rocker joint 3.

As best shown by FIG. 2, the silent chain 1 is formed by interleaved rows of link plates 2. A row is formed across the width of the silent chain 1 by link plates 2 that are positioned adjacent to each other so that the teeth 12 and 14 of one link plate 2 of the row are adjacent to teeth 12 and 14 of an adjacent link plate 2 in that row. Link plates 2 of a row are separated from each other by a link plate 2 of a row of links that is adjacent along the chain direction C. The silent chain 1 is formed alternately by rows 52 and 54 of link plates 2.

The rows 52 are wide rows that are formed by 5 link plates 2 and two guide plates 4 that are positioned as the outermost plates of the rows 52 across the width of the silent chain 1. The rows 54 are narrow rows that are formed by six link plates 2. The link plates 2 at the outer extent of the rows 54 are positioned between a guide plate 4 and a link plate 2 of the adjacent wide rows 52. The four inner link plates 2 of a row 54 are positioned between adjacent link plates 2 of the adjacent wide rows 52. The link plates 2 and guide plates 4 of a row 52 are maintained in a fixed position with respect to each other, as described below, and act collectively to form a chain link of silent chain 1. Similarly, the link plates 2 of a row 54 are maintained in a fixed position with respect to each other and act collectively to form a chain link of silent chain 1.

The rocker joints 3 are positioned within the silent chain 1 so that, within a row 52, a rocker 8 is positioned in each opening 17 and 19 of a link plate 2 so that it is adjacent to the crotch 15. A pin 7 is positioned in each opening 17 and 19 so that it is adjacent to the rocker 8 and away from the crotch 15 along the chain direction C. The rocker 8 and the pin 7 are adjacent along the chain direction C and positioned so that the rocker surface 41 of the rocker 8 is adjacent to the rocker surface 25 of the pin 7.

As shown by FIG. 4, the opening 17 in a link plate 2 defines a convex seating surface 18 that extends into the opening 17. The link seating surface 18 is positioned along the opening 17 opposite the tooth 14 along the chain direction C. The link seating surface 18 faces at least partially along the chain direction C toward the tooth 14. The link seating surface 18 is configured to generally conform to the pin seating surface 27. The pin 7 is sized to position the side surfaces 31 and 33 adjacent to the opening 17 adjacent to the link seating surface 18 when the pin seating surface 27 abuts the link seating surface 18. The side surfaces 31 and 33 and the seating surface 27 of the pin 7 will abut the link opening 17 and the link seating surface 18 to prevent the pin 7 from rotating within the opening 17.

The opening 17 is generally arcuate away from the link seating surface 18. The convex side surfaces 45 and 47 of the rocker 8 are configured to generally conform to the opening 17 at locations away from the seating surface 18. When positioned within the opening 17 adjacent to a pin 7, the rocker side surfaces 45 and 47 can move along the opening 17, and the concave rocker seating surface 43 extends into the rocker 8 and away from the opening 17. The rocker 8 can rock within the opening 17 by rocking contact of the rocker rocking surface 41 with the pin rocking surface 25.

The rocker 8 extends along an arc from the rocker end 35 to the rocker end 37. When positioned along a pin 7, the rocker rocking surface 41 contacts the pin rocking surface 25 near the ends of the rocker 35 and 37. Between the rocker ends 35 and 37, the rocker rocking surface 41 will be separated from the pin rocking surface 25 and the rocker side surfaces 45 and 47 will be adjacent to the opening 17 as shown by FIG. 4. Near the rocker ends 35 and 37, the rocker rocking surface 41 will abut the pin rocking surface 25 as shown by FIG. 5.

Figure 5:
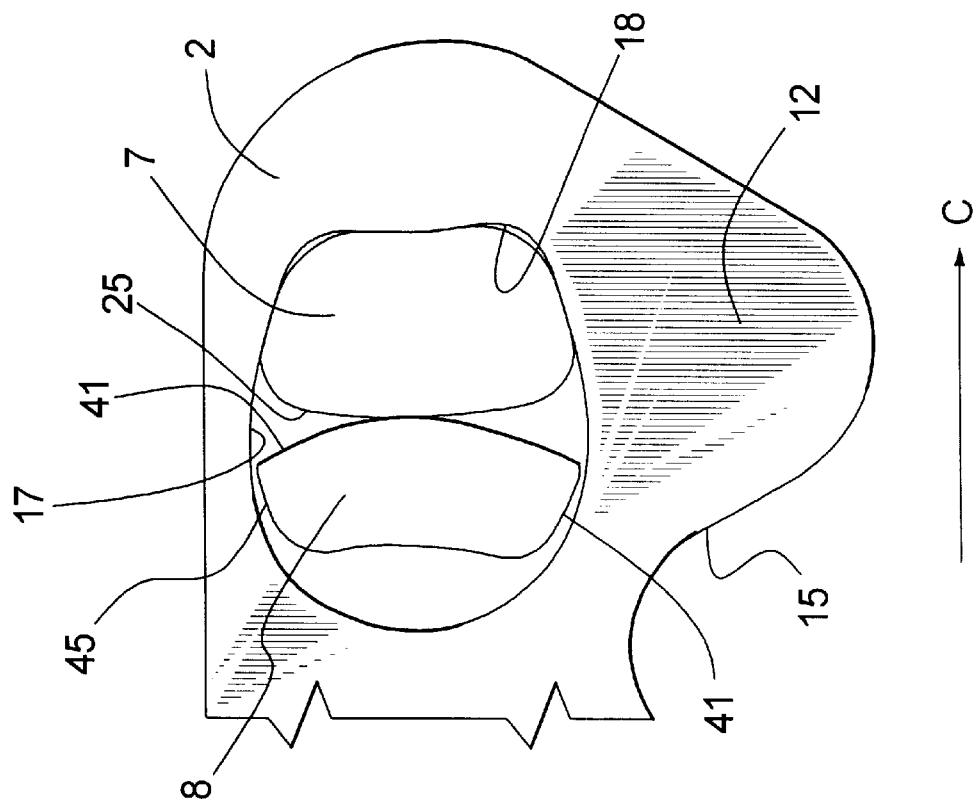
FIG. 5 is a side view of a section of a silent chain link plate and rocker joint according to the present invention near an end of the rocker joint.

The link plates 2 of a row 54 that are interleaved between link plates 2 of a row 52 that are shown by FIG. 4 and FIG. 5. A tooth 14 of the link plates 2 of a row 54 will be adjacent the tooth 12 of a row 52 link plate 2 as shown by FIG. 4 and FIG. 5. As shown by FIG. 6, the pin 7 and the rocker 8 extend through the opening 19 of the interleaved link plate 2 of an adjacent row 54. Within a row 54, a rocker 8 is positioned in each opening 17 and 19 of a link plate 2 so that it is adjacent to a pin 7 and away from the crotch 15 along the chain direction. The positions of the pin 7 and rocker 8 within the openings 17 and 19 of as link plate 2 are reversed for link plate 2 in a row 54 as compared to their positions in openings 17 and 19 of a link plate 2 in a row 52.

As shown by FIG. 6, The opening 19 is configured as is the opening 17 to have a convex seating surface 20 that extends into the opening 19. The seating surface 20 is positioned along the opening 19 opposite the tooth 12 along the chain direction C. The link seating surface 20 faces at least partially along the chain direction C toward the tooth 12. The link seating surface 20 is configured to generally conform to the rocker seating surface 43. The rocker 8 is sized to position the side surfaces 47 and 45 against the opening 19 adjacent to the link seating surface 20 when the rocker seating surface 43 abuts the link seating surface 20 to prevent the rocker 8 from rotating within the opening 19.

The opening 19 is generally arcuate away from the link seating surface 20. The convex sides 31 and 33 of the pin 7 are configured to generally conform to the opening 19 at locations away from the link seating surface 20. When positioned within the opening 19 adjacent to a rocker 8, the pin side surfaces 31 and 33 can move along the opening 19, and the concave pin seating surface 27 extends into the pin 7 and away from the opening 19. The pin 7 can rock in the opening 19 by rocking contact of the pin rocking surface 25 against the rocker rocking surface 41.

The pin 7 extends through openings 17 in the link plates 2 of a row 52 as shown by FIG. 4 and 5 engages and rotates with those link plates 2. The rocker 8 extending through those openings 17 moves within those openings 17 by rocking contact of the rocker rocking surface 41 on the pin rocking surface 25. The link plates 2 of a row 54 shown by FIG. 6 engage the rocker seating surface 43 of a rocker 8 at link seating surface 20 of openings 19. The rocker 8 rotates with those link plates 2 of a row 54. The pin 7 extending through those openings 19 moves within those openings 19 by rocking contact of the pin rocking surface 25 on the rocker rocking surface 41. The row of link plates 2 of a row 52 having the pin 7 and rocker 8 extend through the opening 17, as shown by FIG. 4 and FIG. 5, and having the pin seating surface 27 engage the link seating surface 18 moves with the pin 7 while the interleaved links 2 of a row 54 having the pin 7 and rocker 8 extend through an opening 19, as shown by FIG. 6, and having the rocker seating surface 43 engage the link seating surface 20 moves with the rocker 8.

The rocker 8 and the pin 7 are sized similarly. The pin 7 is configured so that it can be positioned within the opening 19 of a link plate 2 so that the pin seating surface 27 will engage the seating surface 20 and the pin side surfaces 31 and 33 will engage the opening 19 so that the pin 7 will not rotate within the opening 19. Similarly, the rocker 8 is sized to be positioned within an opening 19 with a pin 7 engaging the seating surface 20 so that the rocker rocking surface 41 contacts the pin rocking surface 25 and the rocker can rotate within the opening 19 by rocking contact with the pin 7. As can be seen from FIG. 1, the pin 7 and rocker 8 are positioned within the openings 19 of the link plates 2 of a wide row 52 in this manner.

Similarly, the rocker 8 can be positioned within the opening 17 so that the rocker seating surface 43 engages the seating surface 18 and the rocker side surfaces 45 and 47 engage the opening 17 so that the rocker will not rotate within the opening 17. The pin 7 is sized so that the pin 7 can be positioned within an opening 17 in which a rocker 8 engages the seating surface 18. The pin 7 can be positioned against the rocker 8 so that the pin rocking surface 25 is adjacent to the rocker rocking surface 41 and the pin can rotate within the opening 17 by rocking contact of the pin 7 rocking surface 25 against the rocker rocking surface 41. As will be appreciated from FIG. 1 and FIG. 2, a pin 7 and a rocker 8 are positioned within openings 17 of link plates 2 of narrow rows 54 in this manner.

The arc configuration of the rocker 8 is referred to as inwardly cambered. This inward camber allows the rocker to flex along the chain direction C to provide a tighter fit between the rocker joint 3 and the link openings 17 and 19 than can be achieved by a straight rocker. The camber of the rocker 8 increases the joint's stiffness, thereby reducing tight strand resonance and the noise associated with it. Furthermore, by taking up the clearance between the rocker joint 3 and the link openings 17 and 19, the camber helps to minimize free play in the chain, thus reducing the wash, or link-to-link noise.

The inward camber results in the ends 35 and 37 of the rocker 8 contacting the pin 7, and the maximum gap between the pin 7 and rocker 8 occurring at or near their longitudinal midpoint. Thus, there is no gap between the rocker 8 and the pin 7 near the ends 35 and 37 of the rocker 8. Consequently, the silent chain 1 can be assembled by positioning the rocker 8 against the pin 7 and pushing both through the aligned link openings 17 and 19 of the interleaved link plates 2 of rows 52 and 54. The minimum width of the pin and rocker is at the ends 35 and 37 of the rocker, one of which leads the rocker 8 and pin 7 through openings 17 and 19 as the chain 1 is assembled. An outwardly cambered, would create a gap between the rocker ends 35 and 37 and the pin 7. In that case, the maximum width of the rocker joint 3 would then be the first part entering each opening 17 and 19 in the links 2, making assembly much more difficult. Therefore, the inward camber of the rocker is an important advantage for assembly.

The pin 7 is straight and longer than the rocker 8 allowing that pin 7 to engage and hold the outer guide plates 4 of a row 52, and thereby hold the interleaved link plates 2 of an adjacent row 54 against the link plates 2 and guide plates 4 of the row 52 in the direction of the chain's width. As shown by FIG. 1, the guide plates 4 have openings 11 and 13 through which pins 7 extend. The rockers 8 are shorter than the pins 7 and do not extend into the guide plates 4. The pins 7 may be secured to the guide plates 4 by a press fit with the openings 11 and 13. Alternatively, riveting may secure the pin 7 to the guide plates 4.

In one embodiment, the amount of camber of the rocker 8 is in the approximate range of 0.002"–0.008" for a standard chain that is 0.750" wide and has a pin that is approximately 0.110" in diameter. For that chain, the noise of operation with conventional rocker joints and with rocker joints according to the present invention in which the rocker camber is 0.006" is tabulated below for an operation speed range of 300–2000 RPM.

| Chain System | Pitch Frequency SRA (dBA) | Second Harmonic SRA (dBA) | Overall Level SRA (dBA) |
|---|---|---|---|
| Production Chain | 56.5 | 47.9 | 73.2 |
| Chambered Rocker Chain | 56.0 | 48.9 | 69.1 |
| Improvement | 0.5 | (1.0) | 4.1 |

A rocker joint according to the present invention may be used to join links of a silent chain that is self-guided instead of having guide links. In the self-guided chain, the outer links have a different crotch height than the inner links. Previously referred to U.S. Pat. No. 5,588,926 shows a self-guided chain.

A rocker joint according to the present invention may join links could be stacked in a block configuration, rather than being interleaved. FIG. 2 of U.S. Pat. No. 4,758,210, shows such a block configuration.

While the invention will be described in connection with preferred embodiments, it will be understood that those embodiments are not the limit of the invention. Rather, the invention covers all alternatives, modifications, and equivalents within the spirit and scope of the invention as defined by the appended claims.

What is claimed is:

1. A rocker joint for joining a first link of a power transmission chain to a second link that is adjacent to the first link along a chain direction of the chain, each link defining an opening, the openings aligned to define a joint opening extending through the first and second links, said rocker joint comprising:

a pin, said pin
        being generally straight and elongate,
        defining a pin rocking surface configured for rocking contact, and
        engaging the first link to rock with the first link and to position the pin rocking surface within the joint opening, and
    a rocker, said rocker
        defining a rocker rocking surface configured for rocking contact with said pin rocking surface,
        extending a length from a first end to a second end,
        being inwardly cambered along the length from the first end to the second end, positioned in the joint space engaging the second link to rock with the second link and to position the rocker rocking surface adjacent to the pin rocking surface to contact the pin rocking surface near said first and second ends of the rocker.

2. The rocker joint of claim 1 wherein said pin rocking surface includes a convex circular arc rocking surface.

3. The rocker joint of claim 1 wherein said rocker rocking surface includes a convex circular arc rocking surface.

4. The rocker joint of claim 1 wherein said pin is fixed to the first link by riveting.

5. The rocker joint of claim 1 wherein said pin has a length greater than the length of said rocker.

6. The rocker joint of claim 1 wherein said pin includes a pin seat surface, said pin seat surface configured to engage the opening in the first link, wherein and said rocker includes a rocker seat surface, that is configured to engage the opening in the second link.

7. The rocker joint of claim 6 wherein said pin includes a pin side surface extending from the pin rocking surface to the pin seat surface, and the rocker includes a rocker side surface extending from the rocker rocking surface to the rocker seat surface.

8. The rocker joint of claim 6 wherein the pin seat surface is a concave circular arc seat surface, and said rocker seat surface is a concave circular arc seat surface.

9. The rocker joint of claim 6 wherein said pin rocking surface is a convex circular arc rocking surface, and the pin seat surface is a concave a circular arc surface that is concentric with said pin rocking surface.

10. The rocker joint of claim 6 wherein said rocker rocking surface is a convex circular arc rocking surface, and the rocker seat surface is a concave circular arc surface that is concentric with the rocker rocking surface.

* * * * *